(12) United States Patent
Riesenberg et al.

(10) Patent No.: US 6,969,535 B2
(45) Date of Patent: Nov. 29, 2005

(54) METHOD FOR PITTING AND SLICING OLIVES WITH SPRING-LOADED, ADJUSTABLE SLICING KNIFE ASSEMBLY

(75) Inventors: William M. Riesenberg, Walnut Creek, CA (US); Jeff S. Davis, Los Altos Hills, CA (US)

(73) Assignee: Ashlock Company, a Division of Vistan Corporation, San Leandro, CA (US)

( * ) Notice: Subject to any disclaimer, the term of this patent is extended or adjusted under 35 U.S.C. 154(b) by 0 days.

(21) Appl. No.: 10/786,396

(22) Filed: Feb. 25, 2004

(65) Prior Publication Data
US 2005/0183588 A1 Aug. 25, 2005

(51) Int. Cl.[7] ............................................. A23B 4/02
(52) U.S. Cl. ........................ 426/484; 99/547; 99/562; 99/563; 99/565; 99/494; 426/478; 426/485; 83/585; 83/586; 83/598; 83/599
(58) Field of Search .......................... 99/547, 562, 563, 99/565, 494; 426/478, 484, 485; 83/585, 83/586, 598, 599

(56) References Cited

U.S. PATENT DOCUMENTS

| | | | |
|---|---|---|---|
| 4,876,954 A | 10/1989 | Cimperman | 99/545 |
| 4,925,691 A * | 5/1990 | Cimperman | 426/485 |
| 5,722,318 A | 3/1998 | Rico Ruiz et al. | 99/494 |

* cited by examiner

Primary Examiner—Milton I. Cano
Assistant Examiner—Sarah L. Kuhns
(74) Attorney, Agent, or Firm—Girard & Equitz LLP

(57) ABSTRACT

A method and apparatus for pitting olives (or other fruit) and slicing the pitted fruit. In preferred embodiments, a pitting knife and a coring knife horizontally translate each olive to be pitted while the pitting knife, coring knife, and olive revolve together about a horizontal axis, the pitting knife pushes out the pit horizontally as the olive and cup translate along a segment of a circular first path around the axis, the apparatus includes slicing pockets (in positions horizontally separated from the first path) which translate along a circular second path parallel to the first path, after pitting, a pitting knife pulls the pitted olive horizontally away from the first path and into one of the pockets, and the pitted olive in the pocket is sliced by slicing knives as the pitted olive and pocket translate around the axis along a segment of the second path into engagement with the slicing knives. Preferably, the slicing knives are pivotably mounted to a fixedly mounted knife holder, the knife holder allows convenient adjustment of the slicing knives' orientation such as by advancing and/or retracting an easily-accessible adjustment screw, and the slicing knives are spring-biased by the knife holder in a first orientation relative to each object to be sliced so that the slicing knives can temporarily pivot away from debris that translates into engagement therewith and spring back into the first orientation.

8 Claims, 8 Drawing Sheets

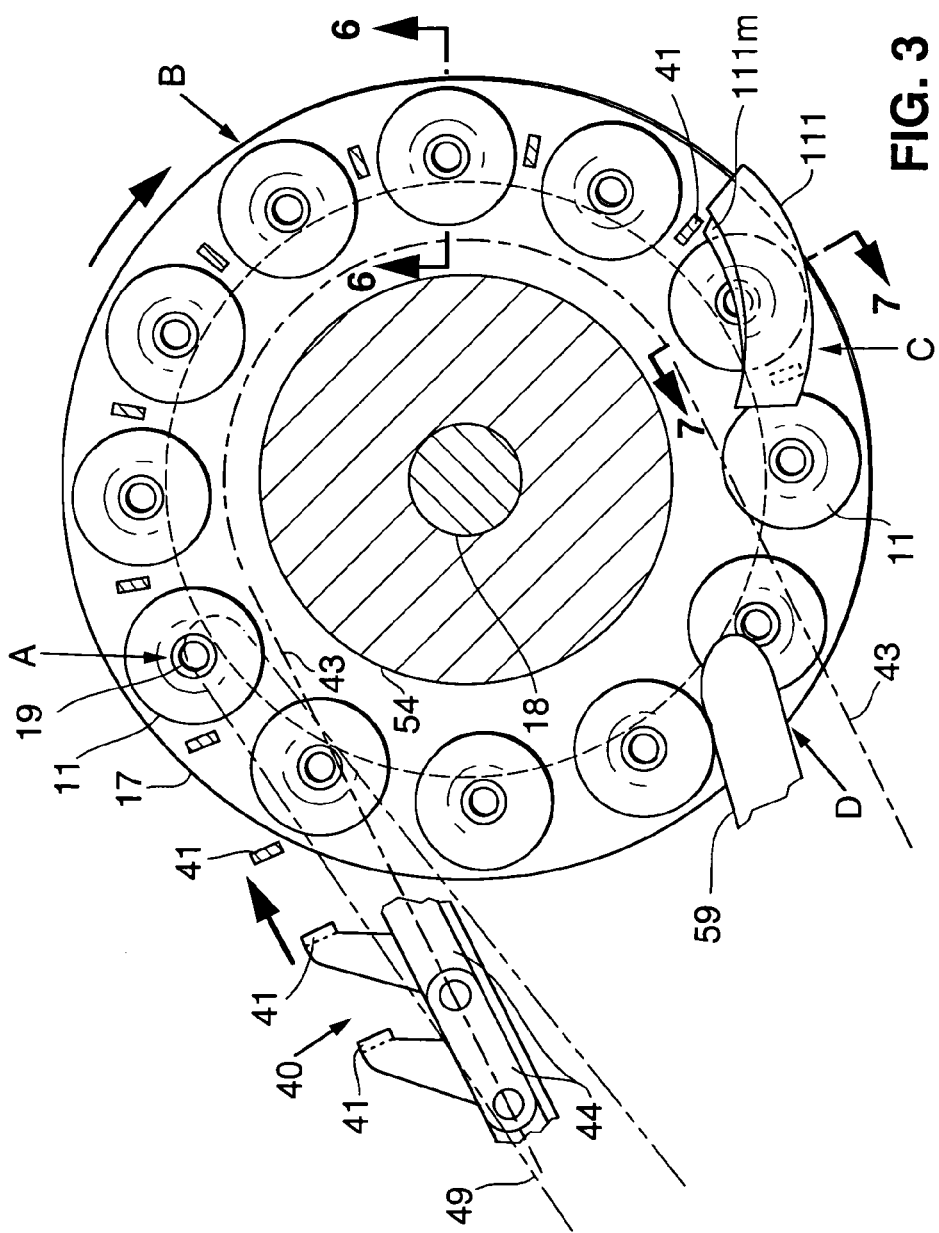

METHOD FOR PITTING AND SLICING OLIVES WITH SPRING-LOADED, ADJUSTABLE SLICING KNIFE ASSEMBLY

FIELD OF THE INVENTION

The invention relates to methods and apparatus for pitting and slicing olives or other fruit. The invention is a method and apparatus for removing the pits from olives (or other fruit) and slicing the pitted fruit.

BACKGROUND OF THE INVENTION

Throughout this application, including in the claims, the term "horizontal" denotes an arbitrary direction (which can be, but is not necessarily, a direction perpendicular to the earth's gravitational field) and the term "vertical" denotes a direction perpendicular to a specific "horizontal" direction. For example, preferred embodiments of the inventive apparatus have elements which define cam tracks and which rotate as a unit with a "horizontally" oriented drive shaft. As the elements rotate, the cam tracks cause pitting and coring knives to advance and retract horizontally. The drive shaft's longitudinal axis is preferably oriented perpendicularly to the earth's gravitational field (since this orientation allows gravity to pull pits and pitted fruit perpendicularly away from the knives of the inventive apparatus during operation), but it need not be and is not in some implementations of the invention.

One type of apparatus for pitting and slicing olives is described in U.S. Pat. No. 4,925,691, issued May 15, 1990, and in U.S. Pat. No. 4,876,954, issued Oct. 31, 1989, both assigned to Ashlock Company. In typical implementations of such apparatus, cam-driven pitting and coring knives advance and retract horizontally to pit olives as the knives (and olives) are carried along a generally circular path around a horizontal shaft. Each olive rests in a cup while the olive has its pit removed by a pitting knife, as both the olive and cup translate along a first segment of the circular path around the horizontal shaft. The pitted olive is then sliced by fixed or rotating slicing knives (or water jets) while the pitted olive (still in the cup) translates along a second segment of the circular path around the horizontal shaft.

Another apparatus for pitting and slicing olives is described in U.S. Pat. No. 5,722,318, issued Mar. 3, 1998. In this apparatus, cam-driven pitting and coring knives push out the pit (from within each olive) in a horizontal direction through a hole in a cup, while the olive is seated in the cup and the olive and cup translate along a segment of a first circular path around a horizontal axis. The apparatus includes slicing cradles that are mounted in positions horizontally separated from the first circular path. During operation, the slicing cradles revolve around the horizontal axis along a second circular path that is parallel to the first circular path. After each olive is pitted, a retracting pitting knife pulls the pitted olive horizontally away from the cup and into one of the slicing cradles. As the pitting knife pulls the pitted olive from the cup into the slicing cradle, the pitted olive translates along a generally helical path around the horizontal axis from a point along the first circular path to a point along the second circular path. Then, the pitted olive (in the slicing cradle) is sliced by fixedly-mounted slicing knives as the pitted olive and cradle translate around the horizontal axis along a segment of the second circular path into engagement with and then past the slicing knives. By slicing the pitted olives as they move along a circular slicing path that is horizontally displaced from a circular pitting path, a waste chute (below the pitting path) can receive unpitted olives (e.g., any olive that is not picked up between a pitting knife and a coring knife upon entering the apparatus) and debris (e.g., pit fragments) that translate along the pitting path and then fall into the waste chute. A separate product chute below the slicing path can receive olive slices that fall into it from the slicing path.

However, the apparatus described in U.S. Pat. No. 5,722,318 has several limitations and disadvantages, including the following. If hard debris enters the slicing cradle (e.g., a pit or pit fragment that clings to a pitted olive), the debris can become jammed against the slicing knives as the debris translates with the slicing cradle into engagement with the slicing knives. As a result, the slicing knives can be dulled or damaged. Also, the slicing knives are not conveniently adjustable relative to the path of pitted olives to be sliced.

It had not been known until the present invention how to design an apparatus for pitting and slicing olives (or other fruit) in a manner overcoming the noted disadvantages and limitations of conventional pitting and slicing apparatus.

SUMMARY OF THE INVENTION

The invention is a method and apparatus for pitting olives (or other fruit) and slicing the pitted fruit. In preferred embodiments, olives are fed into the apparatus and gripped between opposed cam-driven pitting knives and cam-driven coring knives. Preferably, a pitting knife and a coring knife translate each olive in a first horizontal direction against a cup (while the pitting knife, coring knife, and olive rotate together as a unit about a horizontal axis) and the pitting knife then pushes out the pit (from within the olive) in the first horizontal direction through a hole in the cup as the olive and cup translate along a segment of a circular first path around the horizontal axis. The apparatus includes slicing pockets in positions horizontally separated from the first path. During operation, the slicing pockets revolve around the horizontal axis along a circular second path that is parallel (or generally parallel) to the first path. After each olive is pitted, a pitting knife pulls the pitted olive (in a horizontal direction opposite to the first horizontal direction) away from the cup and into one of the slicing pockets. As the pitting knife moves the pitted olive from the cup into the slicing pocket, the pitted olive translates along a generally helical path around the horizontal axis from a point along the first path to a point along the second path. Then, the pitted olive (in the slicing pocket) is sliced by a set of slicing knives as the pitted olive and pocket translate around the horizontal axis along a segment of the second path into engagement with and then past the slicing knives.

Preferably, the apparatus has a frame, the slicing knives are pivotably mounted to a knife holder (sometimes referred to herein as a knife assembly holder), and the knife holder is fixedly mounted to the frame during operation. Preferably, the knife holder's position relative to the frame can conveniently be adjusted before operation of the apparatus commences. Also preferably, the knife holder is configured to allow convenient adjustment of the slicing knives' orientation relative to the frame (even during operation), such as by advancing and/or retracting an easily-accessible adjustment screw. Also preferably, the slicing knives are spring-loaded by the knife holder such that the slicing knives are spring-biased toward each object to be sliced and such that the slicing knives can temporarily pivot away from hard objects (e.g., can be pushed away by olive pits or other hard debris) that translate into engagement with them, and the slicing knives can then spring back to their original position (e.g., when an olive pit or other hard debris has translated away from the slicing knife assembly).

In preferred embodiments, the inventive apparatus includes a set of N cups mounted in a vertically-oriented pitting plate (N is typically equal to 12), and a set of N slicing pockets defined by a chuck plate assembly displaced horizontally from the pitting plate. The pitting plate and chuck plate assembly are mounted to (and coaxial with) a horizontal drive shaft, at horizontally separated locations along the drive shaft. The drive shaft is rotatably mounted to a frame and the pitting plate and chuck plate assembly rotate as a unit with the drive shaft. In operation of these embodiments, each olive is swept by pusher elements (attached to or otherwise driven by a drive chain) or by some other means (such as belts) onto the first path and the olive is then engaged by an advancing coring knife and an advancing pitting knife. The pitting and coring knives have a common longitudinal axis and advance in opposite directions into engagement with the olive. The pitting and coring knives then move the olive horizontally against one of the cups (while the olive and pitting and coring knives rotate together as a unit about the drive shaft) and push out the pit from within the olive horizontally through a hole in the cup while the olive translates along the segment of the first path. After the pitting operation, the pitting knife retracts horizontally, thereby pulling the pitted olive into one of the slicing pockets. The pitting knife continues to retract until it is clear of the pitted olive and slicing pocket. Preferably, the chuck plate assembly defines vertically-oriented slots, with each slicing pocket having M of the slots (where M is typically equal to 3) in its olive-supporting surface. The slicing knife assembly is fixedly mounted to the frame, and includes M vertically oriented slicing knives. The chuck plate assembly is mounted relative to a slicing knife assembly such that, in operation, the slicing pockets translate past the slicing knives (with each slot of each pocket providing clearance for a different one of the slicing knives to pass entirely through an olive in the pocket, as the pocket translates the olive past the slicing knives) as the drive shaft and chuck plate assembly rotate together as a unit relative to the frame. Each slot receives one of the slicing knife edges after the edge has passed through a pitted olive in the pocket. The resulting olive slices typically then fall into a product chute. Preferably, a stripper element is mounted to the frame (e.g., a stripper bar or plate fixedly mounted to the frame, or a fluid jet assembly) in a position such that the stripper element can separate from the chuck plate assembly any olive slices that cling thereto after the slicing operation (allowing the slices to fall into the product chute) as the chuck plate assembly sweeps past the stripper element.

Preferably, the blades of the slicing knives are oriented substantially parallel to the plane of each slicing pocket's path, so that the slicing knives act as wedges to sever a pitted olive cleanly into slices as the pitted olive translates past the slicing knives.

Any unpitted olives (e.g., any olive that is not picked up between a pitting knife and a coring knife) and/or debris (e.g., pit fragments) that translate along the first path past the segment of the first path at which pitting is performed can fall into a waste chute (below the first path). The waste chute can be positioned at a different location (along the axis of the horizontal drive shaft) from the product chute (below the second path) into which the slices of each pitted olive fall.

BRIEF DESCRIPTION OF THE DRAWINGS

FIG. 3 is a cross-sectional view taken along line 3—3 of FIG. 1.

DETAILED DESCRIPTION OF THE PREFERRED EMBODIMENTS

Figure 1:
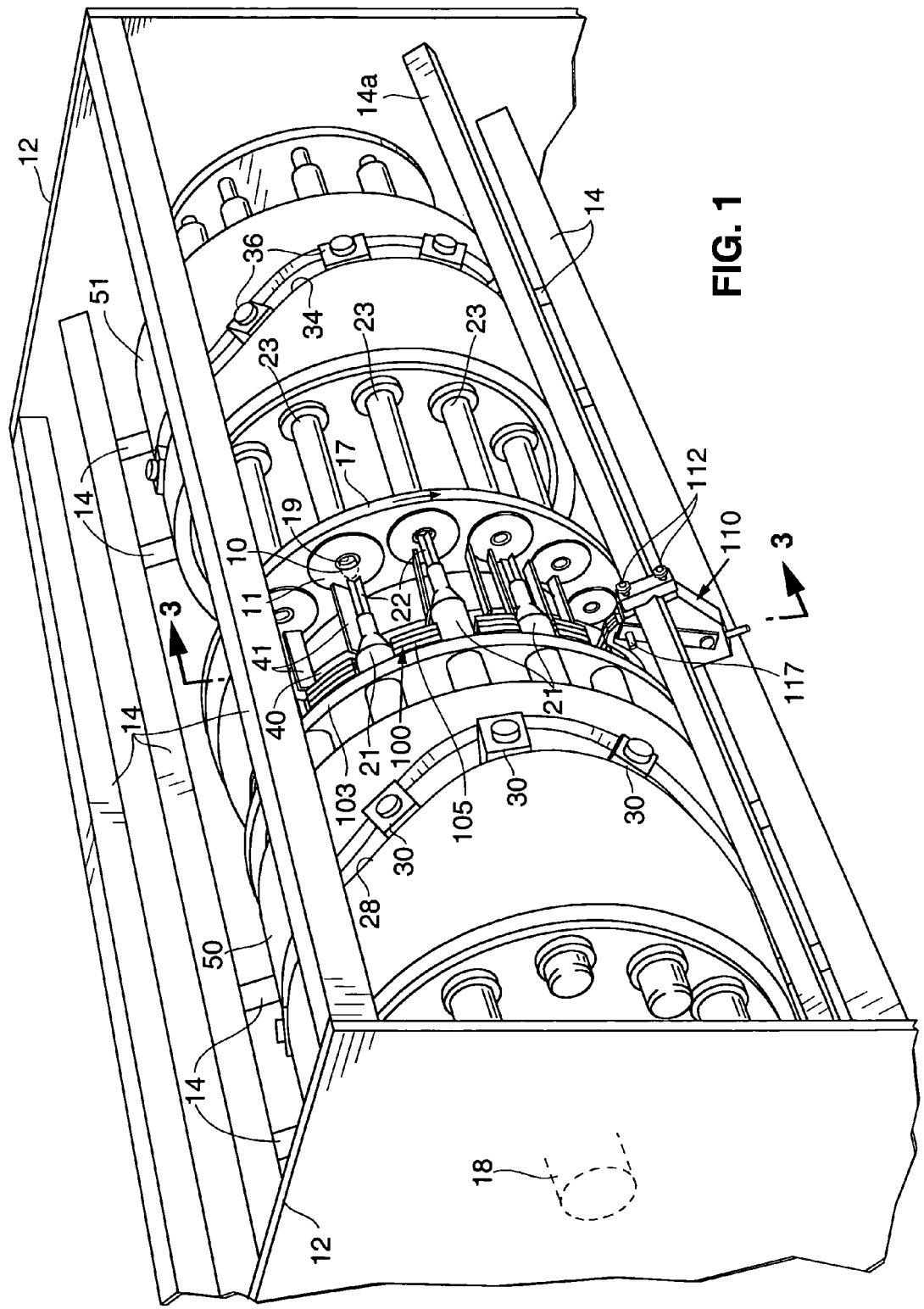
FIG. 1 is a perspective view of an apparatus embodying a preferred embodiment of the invention.

The overall arrangement of a preferred embodiment of the inventive apparatus will be described with reference to FIGS. 1–11. The rigid frame of the apparatus includes end plates 12 and rigid frame members 14 and 14a between plates 12. Horizontally oriented drive shaft 18 is rotatably attached to end plates 12. A drive means (not shown) rotates shaft 18 relative to plates 12 and members 14. Cylinder 50 and cylinder 51 are fixedly attached to frame members 14, so that they remain stationary as shaft 18 rotates. A number of elements, including plate 17, chuck plate assembly 100, and members 53 and 54 (and other elements to be described below) are fixedly attached to shaft 18, and thus rotate as a unit with shaft 18 while frame members 14 and end plates 12 remain stationary. Plunger shafts 21 extend slidably through holes around the periphery of members 53 between plate 17 and one end of the apparatus (the left end, if viewed as in FIG. 4), and plunger shafts 23 extend slidably through holes around the periphery of members 53 between plate 17 and the other end of the apparatus (the right end, if viewed as in FIG. 4).

Cam track 28 is defined in the side wall of cylinder 50. Cam track 34 is defined in the sidewall of cylinder 51. As shaft 18 rotates, cam followers 30 ride in track 28 and cam followers 36 ride in track 24. A member 29 is connected between each cam follower and each of plunger shafts 21 and 23. Thus, when shaft 18 rotates, cam followers 30 and 36, members 29, and shafts 21 and 23 move (horizontally) parallel to the longitudinal axis of shaft 18, while also rotating with shaft 18 about shaft 18's longitudinal axis.

Drive shaft 18 extends through the center of plate 17, and is fixedly attached to plate 17. Inserts 11 (having the structure shown in FIG. 8) are mounted around the periphery of plate 17, and each insert 11 defines a cup into which each olive can be pushed. A hole 19 extends through the center of each insert 11 (and the cup defined thereby). The pit of each olive 10 can be pushed through hole 19, as the pit is pushed out from within the olive by an advancing pitting knife 22. When shaft 18 rotates, inserts 11 are translated along a circular path in a vertical plane perpendicular to the longitudinal axis of shaft 18.

Chain 40, which comprises a plurality of links 44 (two of which are shown in FIG. 3), extends around a sprocket (not shown) adjustably mounted on member 54 in front of plate 17 (in the FIG. 3 view). Chain 40 is only partially shown in FIG. 3, since if it were completely shown it would obscure plate 17 and various other elements in FIG. 3. As shaft 18 rotates clockwise (viewed as in FIG. 3), member 54 rotates plate 17 clockwise, and causes chain 40 to rotated clockwise around path 43.

A coring knife 24 is attached to the end of each of shafts 23. A pitting knife 22 is attached to the end of each of shafts 21. Plate 17 and members 53 and 54 are oriented so that each insert 11 is aligned between one of knives 22 and one of knives 24, and so that the longitudinal axis of each component in each combination of these components (knives 22 and 24 and the insert 11 therebetween) coincides with the longitudinal axes of the other components in the combination. As shaft 18 rotates, plate 17 and members 53 rotate as a unit with shaft 18 so that each insert 11 and the corresponding knives 22 and 24 traverse parallel paths around the longitudinal axis of shaft 18.

Each link 44 of chain 40 has a pusher arm 41 that extends perpendicularly out from the link (parallel to the longitudinal axis of shaft 18). As shaft 18 (and thus chain 40) rotates, olives 10 are fed onto inclined ramp 49 (shown in phantom view in FIG. 3). Each of the pusher arms 41 is positioned relative to ramp 49 to be capable of sweeping one of the olives along ramp 49 toward and then (at station A of FIG. 3) between one of coring knives 24 and the corresponding one of pitting knives 22, while cam followers 30 and 36 cause the knives 22 and 24 to advance horizontally toward the olive. The knives 22 and 24 continue to advance toward each other until they engage opposite ends of the olive and until both knives 22 and 24 penetrate through the olive flesh and reach the olive pit. After knives 22 and 24 have advanced into engagement with the olive, one or both of the knives 22 and 24 translate the olive along its processing path (until it is sliced), although the pusher arm 41 may in some cases (or some implementations) exert some force on the olive tending to push the olive around the longitudinal axis of shaft 18. In preferred operation of preferred implementations, pusher arm 41 does not exert force on the olive after opposite ends of the olive have been engaged by a pair of knives 22 and 24.

Before knives 22 and 24 translate the olive into engagement with any of inserts 11, knife 24 has made a cylindrical cut in one tip of the olive, and knives 22 and 24 have typically advanced toward each other until both have reached the olive's pit. Knife 22 then continues to advance while knife 24 retracts, until the olive is pushed against pitting cup 13 of one of inserts 11. Knife 22 then continues to advance while knife 24 retracts and pitting cup 13 prevents the olive from moving horizontally, so that knife 22 pushes the olive's pit (and a tip portion of the olive) out from within the olive through insert 11's central hole 19 (at station B of FIG. 3). This pitting operation occurs while the olive and insert 11 translate along a segment of a circular first path around the longitudinal axis of shaft 18 (station B is a point along such segment of the first path).

Each insert 11 is attached to plate 17. Preferably, each insert 11 is fixedly mounted to plate 17 by a snap ring (not shown). Drive shaft 18 is fixedly attached to plate 17 through the center of plate 17. When a drive means (not shown) rotates shaft 18, inserts 11 are translated along the circular first path about the longitudinal axis of shaft 18. It is contemplated that the inventive apparatus may include any number of inserts 11, but will have the same number of coring knives 24 (and pitting knives 22) as inserts 11. In one preferred embodiment, there are twelve inserts 11.

After the pit is pushed out from within an olive in the cup defined by insert 11, the pitting knife 22 (on which the pitted olive is impaled) retracts away from insert 11, thereby pulling the pitted olive away from insert 11 and toward one of the slicing pockets defined by chuck plate assembly 100. Each pitting knife 22 optionally has barbs along its olive-gripping surface to ensure that the olive does not prematurely slide off the retracting knife 22. Alternatively (and also optionally), the apparatus employs some other means to ensure that the olive does not prematurely slide off the retracting knife 22. For example, a fluid jet (e.g., a water, olive oil, or air jet) can be directed (with appropriate orientation) at the olive or a mechanical device can be employed for this purpose. For another example, each knife 22 can be given a surface coating to increase friction.

The pitting knife 22 moves the pitted olive into engagement with slicing knives 111 (including middle knife 111*m*) and then retracts away from the pitted olive and the slicing knives. As shown in FIG. 3 (and FIG. 10), the middle one of knives 111 (knife 111*m*) typically protrudes closer toward shaft 18 than the other knives 111 and thus the pitted olive engages the middle slicing knife (while pitting knife 22 is still engaged with the olive) before it engages the other knives 111. Then, the pitting olive translates into engagement with the other knives 111, and knives 111 slice the pitted olive (at slicing station C of FIG. 3).

In other embodiments, all the slicing knives have the same shape. For example, if it is desired to cause one of the slicing knives to engage the middle of a pitted olive while pitting knife 22 is still engaged with the olive, the middle slicing knife will typically engage the olive before the other slicing knives do even if all slicing knives have the same shape (and orientation), due to the typical shape of an olive (an olive is typically thickest in the middle and thinner toward the ends).

Figure 10:
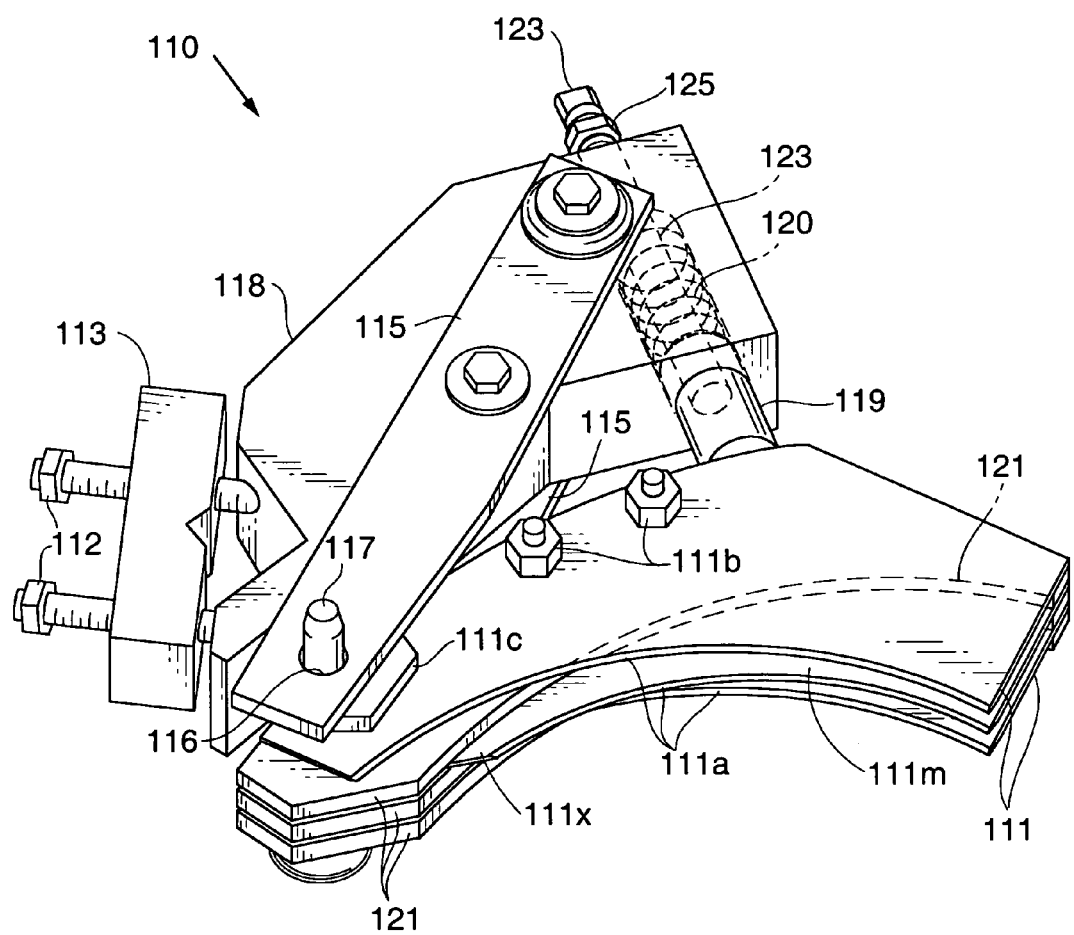
FIG. 10 is a perspective view of slicing knife assembly 110 of the FIG. 1 apparatus.

In other embodiments, the slicing knives have different shapes than shown in FIGS. 3 and 10. For example, if it is desired to cause one of the slicing knives to engage the cored end of a pitted olive while pitting knife 22 is still engaged with the olive, the slicing knife nearest to the coring knife 24 should be shaped to engage the olive before any of the other slicing knives.

The olive slices resulting from the slicing operation fall into a product chute (not shown) positioned below chuck plate assembly 100. Typically, many of the slices simply fall into the product chute. However, since some slices may cling to the slicing pockets, a product stripping means (e.g., element 59 of FIG. 3) is typically employed to actively strip such clinging slices from the inventive apparatus.

Comb-like stripper element 59 has stripper bars that fit into slots 101 of each slicing pocket 104 (one stripper bar for each slot 101). Stripper element 59 is fixedly mounted to one of frame members 14 (at product stripping station D of FIG. 3) in such a position that the stripper bars extend into slots 101 of each slicing pocket 104 to strip any olive slices that cling to the pocket as the pocket translates past element 59, thereby allowing the slices stripped from the pocket to fall into a product chute. Variations on the preferred embodiment of FIGS. 1 through 11 employ other product stripping means, (for example, fluid jets, which could be jets of water, olive oil, or air) to strip any olive slices that cling to the slicing pockets after the slicing operation.

Figure 4:
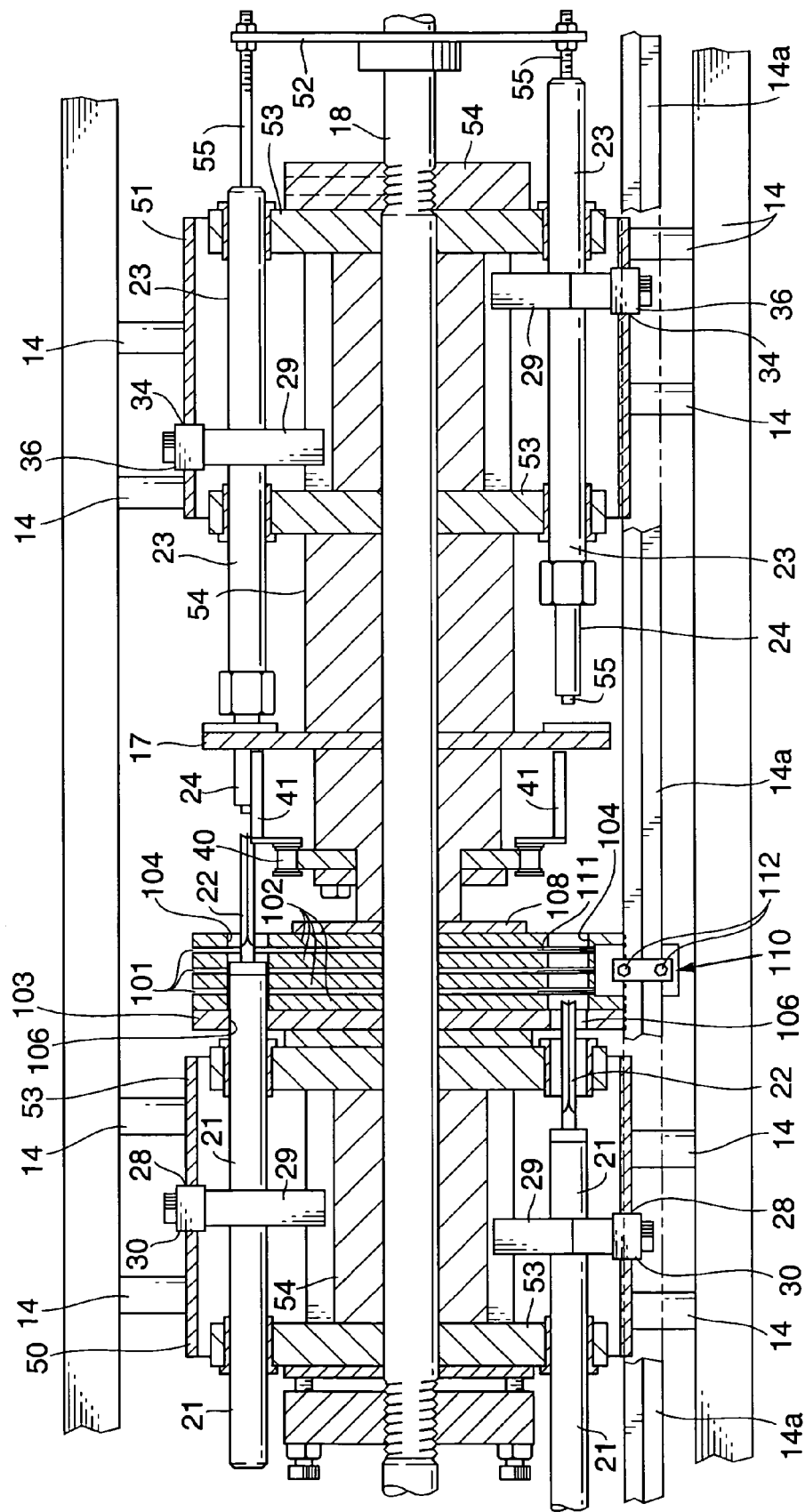
FIG. 4 is a partially elevational, partially cross-sectional view of a portion of the FIG. 1 apparatus.

FIG. 4 is a partially elevational, partially cross-sectional view of a portion of the FIG. 1 apparatus. The upper plunger shaft 23 in FIG. 4 has been driven by the associated cam follower 36 and member 29 connected thereto into a position fully extended to the left. The upper plunger shaft 21 in FIG. 4 has been driven by the associated cam follower 30 and member 29 connected thereto into a position fully extended to the right. Thus, if an olive were engaged with the upper pusher element 41 of chain 40, the upper pitting knife 22 and upper coring knife 24 would each have penetrated a different end of the olive. In FIG. 4, the lower plunger shaft 23 has been driven by the associated cam follower 36 and member 29 connected thereto into a position retracted to the right, and the lower plunger shaft 21 has been driven by the associated cam follower 30 and member 29 connected thereto into a position retracted to the left. Thus, the lower pitting knife 22 has been retracted to avoid hitting slicing knives 111 as the knives 111 slice a pitted olive engaged with chuck plate assembly 100, and the lower coring knife 24 has been retracted to allow any unpitted olive, pit, or pit fragment near to the lower coring knife to fall (or be actively moved) into a waste chute (not shown, but typically positioned under the lower pusher element 41 and lower coring knife 24).

Rotating members 53 rotate shafts 21 and 23 through cylindrical regions surrounding shaft 18. As shafts 21 and 23 rotate, they also translate to the left and to the right as cam followers 36 ride in cam track 34 and cam followers 30 ride in cam track 28.

Each of ejector rods 55 is slidably positioned inside of one of plungers 23 and is rigidly attached to member 52. As shaft 18 rotates, it causes member 52 to rotate relative to stationary frame members 14. The relative movement between plungers 23 and ejector rods 55 causes removal of an olive pit and olive end piece from the coring knife 24 attached to each plunger 23 as the plunger 23 is retracted.

As shaft 18 rotates, plate 17, members 52, 53 and 54, and chuck plate assembly 100 rotate as a unit with shaft 18. However, frame members 14 and 14a and cylindrical members 50 and 51 (and end plates 12 shown in FIG. 1) remain stationary.

Each insert 11 can be fixedly attached to plate 17 in a manner that prevents relative motion between any of inserts 11 and plate 17, or each insert 11 can be attached to plate 17 with freedom to rotate (with respect to its own axis of symmetry) relative to plate 17. In one implementation, each insert 11 is mounted to plate 17 by inserting insert 11 into one of twelve orifices that extend through plate 17 (the orifices are positioned around plate 17, near plate 17's periphery) and snapping a snap ring (not shown) onto an end of each insert 11 to retain the insert in the orifice. Alternative implementations employ a locking ring to attach inserts 11 to plate 17. Such a locking ring can be implemented so that friction between the locking ring, plate 17, and member 54 prevents relative motion therebetween.

Chuck plate assembly 100, shown at least partially in each of FIGS. 1, 2, 4–7, and 9, comprises stripper plate 103, chuck retaining member 108, and two chucks 105 mounted between plate 103 and member 108. Each chuck 105 defines four parallel ridges 102 and three grooves 101 (one groove 101 between each pair of adjacent ridges 102). Each chuck 105 comprises parallel plates 202 separated by spacers 203. Plates 202 (shown in FIG. 9) implement ridges 102 (shown in FIG. 2) and each groove 101 is the space radially beyond (outside of) one of spacers 203 and between two of plates 202.

Figure 12:
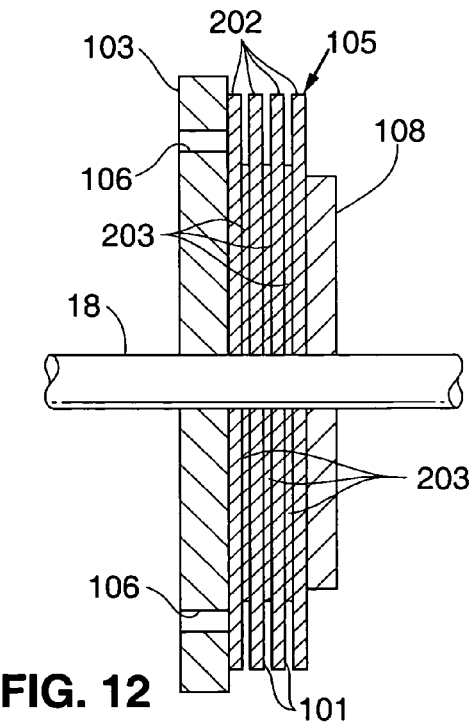
FIG. 12 is a side cross-sectional view of an alternative implementation of chuck plate assembly 100 of FIG. 2.

Chucks 105 can be implemented in any of many different ways. For example, as shown in FIG. 12, each chuck 105 can be machined out of a single block of metal to have large-diameter portions which define ridges 102 and small-diameter portions which define grooves 101 between ridges 102. In FIG. 12, chuck retaining member 108 is shaped differently than in FIG. 9.

Figure 2:
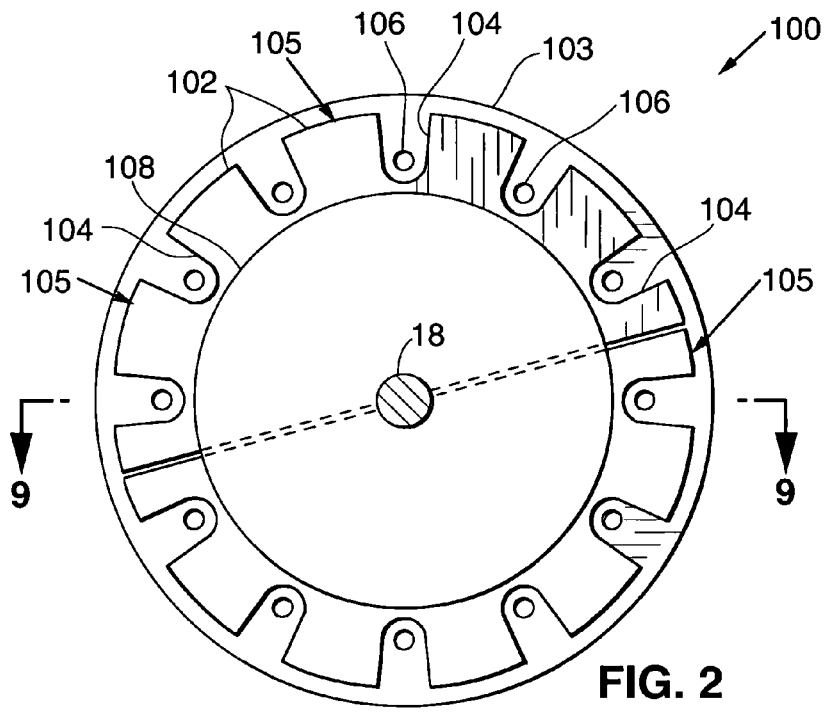
FIG. 2 is a front elevational view of chuck plate assembly 100 of the apparatus shown in FIG. 1.
Figure 9:
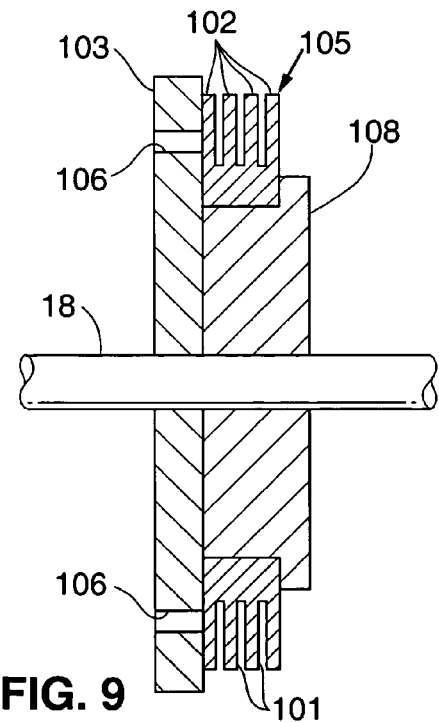
FIG. 9 is a side cross-sectional view of chuck plate assembly 100 of FIG. 2, taken along line 9—9 of FIG. 2.
Figure 7:
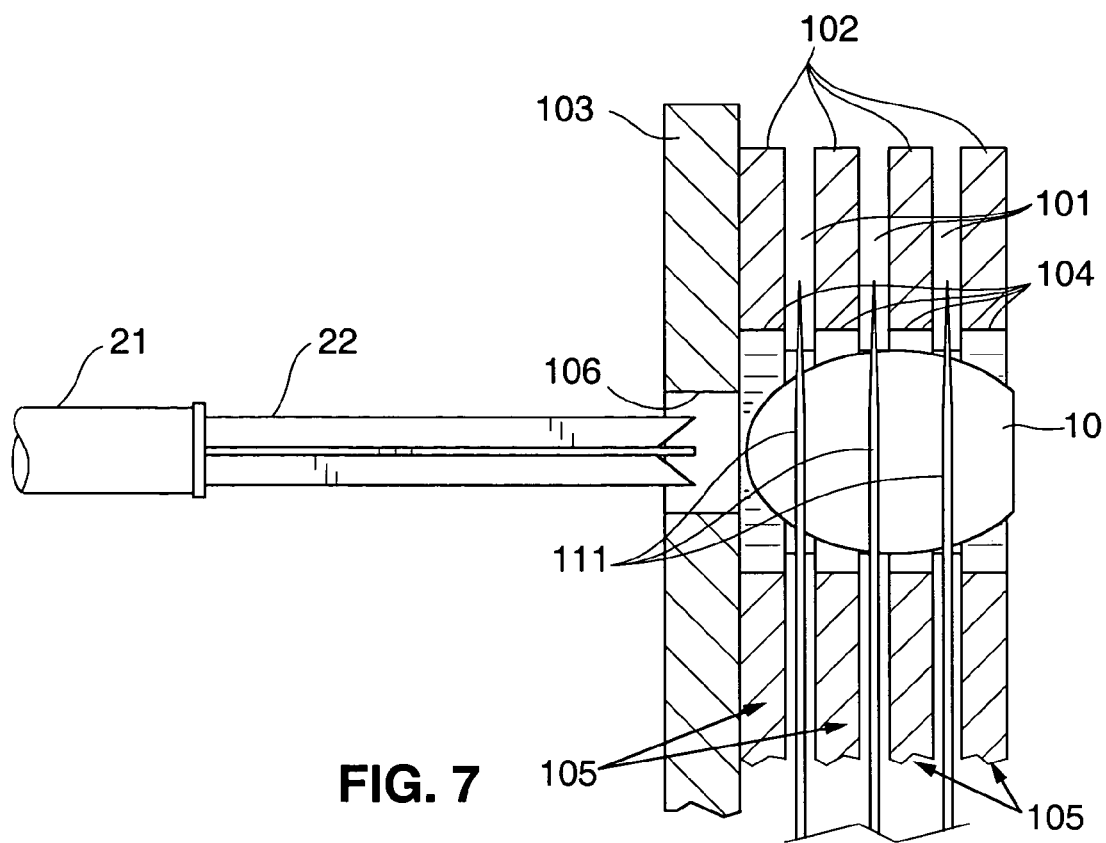
FIG. 7 is a cross-sectional view of a portion of the FIG. 1 apparatus, taken along line 7—7 of FIG. 3.

The outer surfaces of ridges 102 (of each chuck 105) define six concave slicing pockets 104, each pocket 104 for receiving a pitted olive to be sliced. Holes 106 extend through plate 103 around the periphery of plate 103. Plate 103 is mounted relative to shaft 18 so that each of holes 106 is aligned with one of plunger shafts 21. As shown in FIG. 2, each of the twelve slicing pockets 104 is aligned with a different one of holes 106. Each plunger shaft 21 (and pitting knife 22 attached thereto) can retract through one of slicing pockets 104 and the corresponding one of holes 106 with appropriate timing. Specifically, pitting knife 22 pulls a pitted olive (impaled thereon) into pocket 104 as it retracts (to the left in FIG. 7), and pitting knife 22 then continues to retract through hole 106, thereby causing stripping plate 103 to strip the pitted olive from knife 22. Each slicing pocket 104 (and each pitted olive therein) translates (around the longitudinal axis of drive shaft 18) into engagement with slicing knives 111 immediately after the pitting knife 22 is clear of grooves 101 (optionally, pocket 104 translates a pitted olive therein into engagement with slicing knives 111 before pitting knife 22 has separated from the pitted olive, to maintain the desired alignment of the pitted olive). Hole 106 is large enough to allow knife 22 to translate through it, but small enough to prevent a typically-sized olive from being pulled through it by knife 22. When assembly 100 rotates as a unit with shaft 18 with a pitted olive in one of slicing pockets 104, the slicing pocket sweeps past slicing knives 111 such that each groove 101 (of the chuck 105 that defines the slicing pocket) receives one of the knives 111 as shown in FIG. 7 (to be described below).

Thus, during operation, a pitting knife 22 and a coring knife 24 translate each olive to be pitted in a first horizontal direction against a cup 13 (while the pitting knife, coring knife, and olive rotate together as a unit about a horizontal axis) and pitting knife 22 then pushes out the pit (from within the olive) in the first horizontal direction through a hole in the cup as the olive and cup translate along a segment of a circular first path around the horizontal axis. Also during operation slicing pockets 104 (defined by chuck plate assembly 100), in positions horizontally separated from the first path, revolve around the horizontal axis along a circular second path that is parallel (or generally parallel) to the first path. After each olive is pitted, a pitting knife 22 pulls the pitted olive (in a horizontal direction opposite to the first horizontal direction) away from cup 13 and into one of slicing pockets 104. As the retracting pitting knife 22 moves the pitted olive from cup 13 into pocket 104, the pitted olive translates along a generally helical path around the horizontal axis from a point along the first path to a point along the second path. The helical path need not have constant pitch (e.g., the pitted olive need not translate horizontally with constant velocity, even if horizontal drive shaft 18 rotates with constant rotational velocity). Then, the pitted olive (in slicing pocket 104) is sliced by a set of slicing knives 111 as the pitted olive and pocket 104 translate around the horizontal axis along a segment of the second path into engagement with and then past the slicing knives.

Many variations on the implementation of chuck plate assembly 100 shown in FIGS. 1, 2, 4–7, and 9 are possible. For example, the inventive apparatus can include a chuck plate assembly having slicing pockets shaped differently than pockets 104 of the FIGS. 1–11 embodiment, or having more than or less than four separate elements (plate 103, member 108, and two chucks 105), or lacking a separate stripper plate 103 (in which case another element of the chuck plate assembly would define holes through which pitting knives and pitting knife plunger shafts can retract to strip pitted olives from the pitting knives). Various embodiments of the invention can employ any structure that defines slicing pockets for receiving pitted olives to be sliced, and is capable of stripping the pitted olives from pitting knives and translating the pitted olives into engagement with slicing knives (while providing clearance preventing the slicing knives from engaging the pocket-defining structure).

Slicing knife assembly 110 (to be described in more detail with reference to FIGS. 10 and 11) is fixedly mounted to frame member 14a in the position shown in FIGS. 1 and 4. Assembly 110 includes three slicing knives 111 having arcuate blades, and hardware for adjusting the orientation of knives 111 relative to frame member 14a and spring-biasing knives 111 toward the pitted olives to be sliced. The arcuate blade of each slicing knife acts as a wedge to slice cleanly through each pitted olive translating in one of pockets 104 past the knife 111. Slicing knife assembly will be described in more detail below with references to FIGS. 10 and 11.

Figure 5:
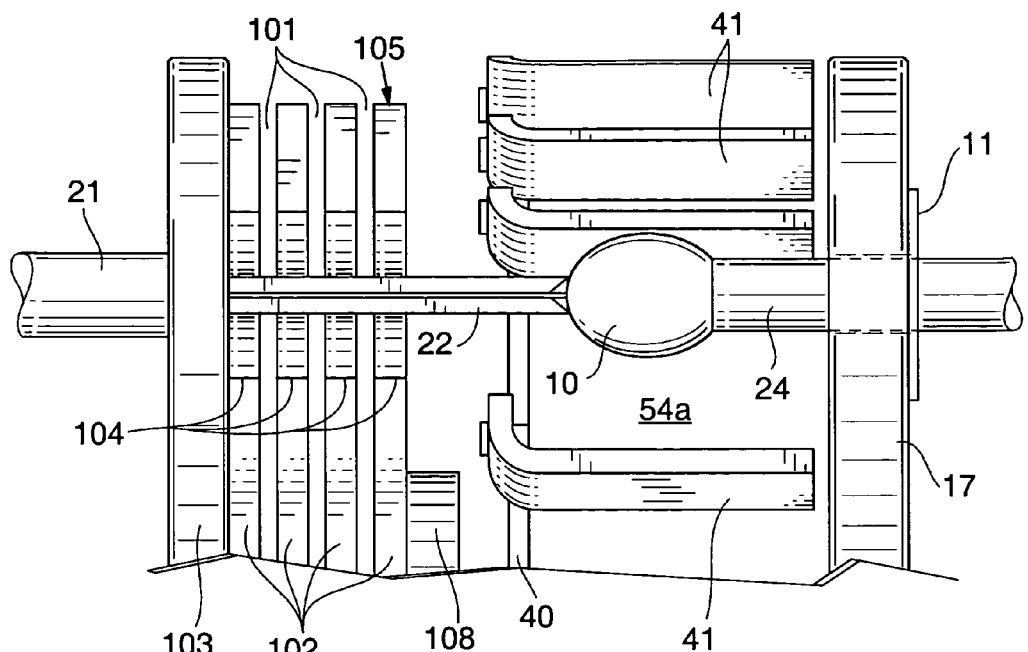
FIG. 5 is a perspective view of a portion of the FIG. 1 apparatus.

The pitting and slicing operations will next be described in more detail with reference to FIGS. 5–7, which show olive 10 at three different positions along its processing path. As shown in FIG. 5, one of pusher elements 41 has pushed olive 10 (along surface 54a of member 54) into the path of an advancing pitting knife 22 and an advancing coring knife 24, and pitting knife 22 and coring knife 24 have advanced (in response to the cam means associated therewith) into engagement with opposite ends of olive 10. Pitting knife 22 has advanced (toward the right of FIG. 5) through a hole (not visible) in plate 103 and through a pocket 104 defined by chuck 105. Coring knife 24 has advanced (toward the left of FIG. 5) through an insert 11 of plate 17 into engagement with olive 10. Pitting knife 22 (which typically has a cross-shaped cross-section with four fins, but which could have another cross-section such as an annular one or a cross-shaped one with three, five, six, or eight fins) has penetrated the left end of olive 10 and coring knife 24 (which is tubular, with an annular cross-section, but which could alternatively have another cross-section such as a cross-shaped cross-section) has penetrated the right end of olive 10.

Figure 6:
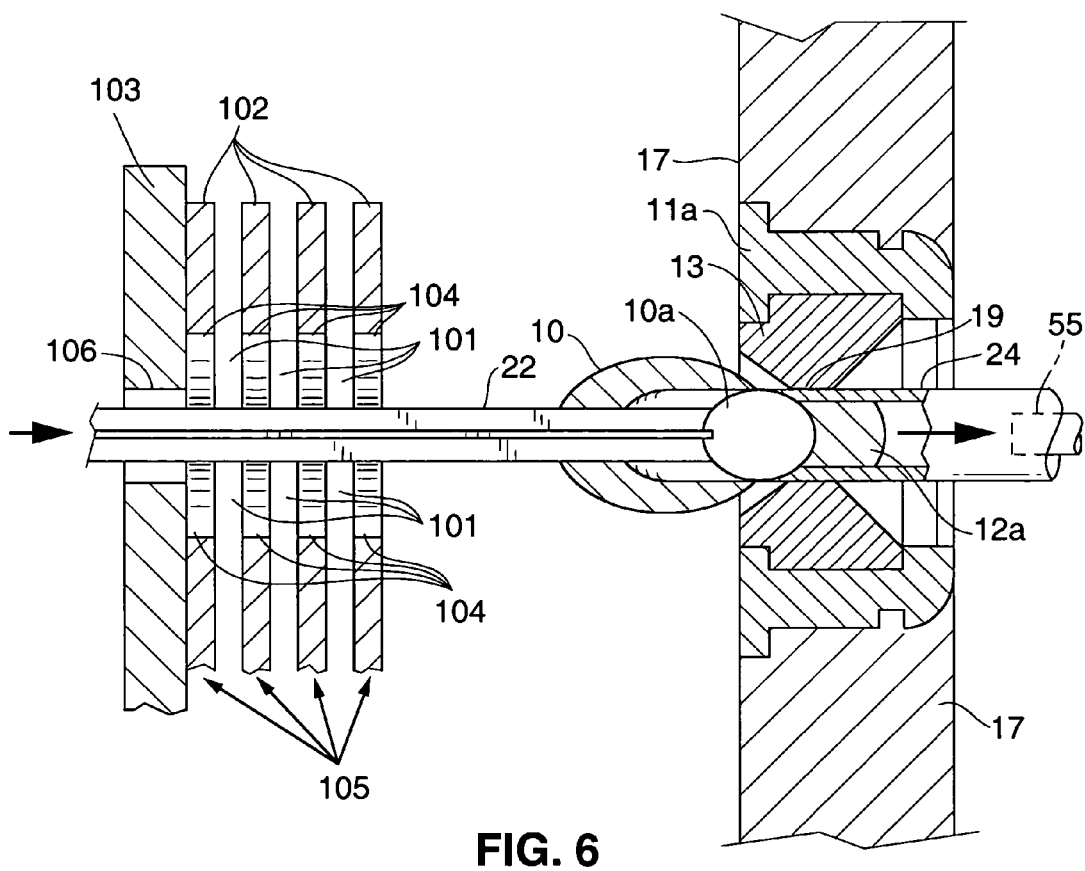
FIG. 6 is a cross-sectional view of a portion of the FIG. 1 apparatus, taken along line 6—6 of FIG. 3.

Each of FIGS. 6 and 7 shows only a portion of one chuck 105 of chuck plate assembly 100 (assembly 100 includes two chucks 105). Each of FIGS. 5, 6, and 7 shows the same pitting knife 22. FIG. 7 does not show the coring knife 24 that is shown in FIGS. 5 and 6.

As shown in FIG. 6, pitting knife 22 has continued to advance (toward the right of FIG. 6) to press olive 10 against pitting cup 13 of an insert 11 of plate 17, while coring knife 24 has retracted (also toward the right of FIG. 6). Tip portion 12a of olive 10 (within cylindrical knife 24) has been severed (sheared) from the rest of olive 10. Tip portion 12a and pit 10a of olive 10 are being ejected (away from the remaining flesh of olive 10, which is restrained by cup 13) through hole 19 in the center of insert 11.

As shown in FIG. 7, the pitted olive 10 is impaled on pitting knife 22. As knife 22 has retracted (toward the left of FIG. 7), it has moved the pitted olive (minus its tip portion 12a) into a pocket 104 defined by a chuck 105 of chuck plate assembly 100. Knife 22 has further retracted (toward the left in FIG. 7) through hole 106 in plate 103 out of engagement with the pitted olive and away from pocket 104, and plate 103 has stripped the pitted olive from knife 22. Assembly 100 has translated the pitted olive (toward the bottom of FIG. 7) into engagement with slicing knives 111. Knives 111 have sliced through the pitted olive, and each knife 111 is received in a different one of the three grooves 101 defined by chuck 105. Cam track 28 (shown in FIG. 1) must be shaped so as to retract knife 22 sufficiently rapidly so that knife 22 avoids slicing knives 111. Optionally, pocket 104 translates the pitted olive into engagement with slicing knives 111 before pitting knife 22 has completely separated from the pitted olive, to maintain the desired alignment of the pitted olive.

When a slicing pocket 104 of chuck plate assembly 100 occupies a segment of its circular path around the longitudinal axis of shaft 18 in which slicing knives 111 have sliced all the way through pitted olive 10, the edge of each knife 111 extends into a corresponding one of grooves 101 in assembly 100. Thus, knives 111 produce three clean cuts which divide pitted olive 10 into four slices. In variations on the described embodiment, the inventive slicing knife assembly includes more or less than three slicing knives (whose blades are parallel to each other and perpendicular to the longitudinal axis of shaft 18), and the inventive chuck plate assembly defines a groove for receiving each slicing knife. After a pitted olive has been sliced in accordance with the invention, the slicing pocket translates the olive slices away from the fixed slicing knives 111 so that the olive slices can then fall into a product chute, or be stripped from the slicing pocket (by a stripper bar or plate, a fluid jet, or another stripping means) and then fall into a product chute.

Slicing knife assembly 110 comprises a knife assembly (including knives 111, pin 117, plates 121 between knives 111, and fastening elements 111b and 111c) and a knife assembly holder (including arms 115, blocks 113 and 118, plunger 119, and mounting screws 112). The knife assembly holder can be mounted to frame member 14a (e.g., in the position shown in FIGS. 1 and 3), with frame member 14a between opposed notches in blocks 118 and 113, and screws 112 threaded into threaded holes in block 118 through holes in block 113. In operation, the knife assembly holder is fixed relative to frame member 14a, and the orientation of knives 111 is adjustable by controlling the position of plunger 119 relative to block 118 in a manner to be described below. Before operation, mounting screws 112 can conveniently be retracted slightly, the knife assembly holder's position relative to chuck plate assembly 100 adjusted (preferably so that knives 111 are centered in the slots 101 of the pockets 104 defined by assembly 100), and screws 112 then can be advanced to fixedly mount slicing knife assembly 110 in the desired position relative to member 14a and assembly 100.

Parallel arms 115 are fixedly attached to block 118 (e.g., by nut and bolt assemblies as shown in FIG. 10). Preferably, the positions of arms 115 relative to block 118 are adjustable (before operation of the inventive apparatus) to enhance the holding position, but are fixed relative to block 118 during use of the apparatus. A hole 116 extends through each arm 115 (near one end of the arm) for receiving pin 117 (pin 117 is inserted through holes 116 to mount the knife assembly pivotably to the knife assembly holder). Plunger 119 is spring-loaded in block 118 in a position for supporting knives 111 and biasing knives 111 toward each object to be sliced. Knives 111 can temporarily overcome the biasing force exerted thereon by plunger 119, to push plunger 119 into block 118 as slicing knives 111 pivot temporarily (counterclockwise about pin 117, as shown in FIG. 10) away from a hard object that translates into engagement with knives 111. For example, in response to an olive pit (or other hard debris) in one of slicing pockets 104 that translates into engagement with knives 111, the slicing knife assembly (including knives 111 and plates 121) can pivot (about pin 117) away from the debris, thereby pushing plunger into block 118. Then, when the debris has translated away from the slicing knife assembly, the slicing knife assembly will spring back to its original position in response to biasing force exerted thereon by plunger 119, as spring 120 pushes plunger 119 outward back to its position of maximal extension out from block 118.

Another advantage of the preferred embodiment described herein is that slicing knife assembly can be easily (and reversibly) removed from the rest of the apparatus (e.g., when pitted but unsliced olives are the desired end product). This can be done simply by removing pin 117 to decouple the knife assembly (comprising knives 111, plates 121 between knives 111, and fastening elements 111b and 111c) from the apparatus, and removing the knife assembly. The knife assembly and pin 117 can be re-installed (returned to their original positions) when desired. No adjustments are needed after de-installation of pin 117 and the knife assembly, or after re-installation of these elements.

Figure 11:
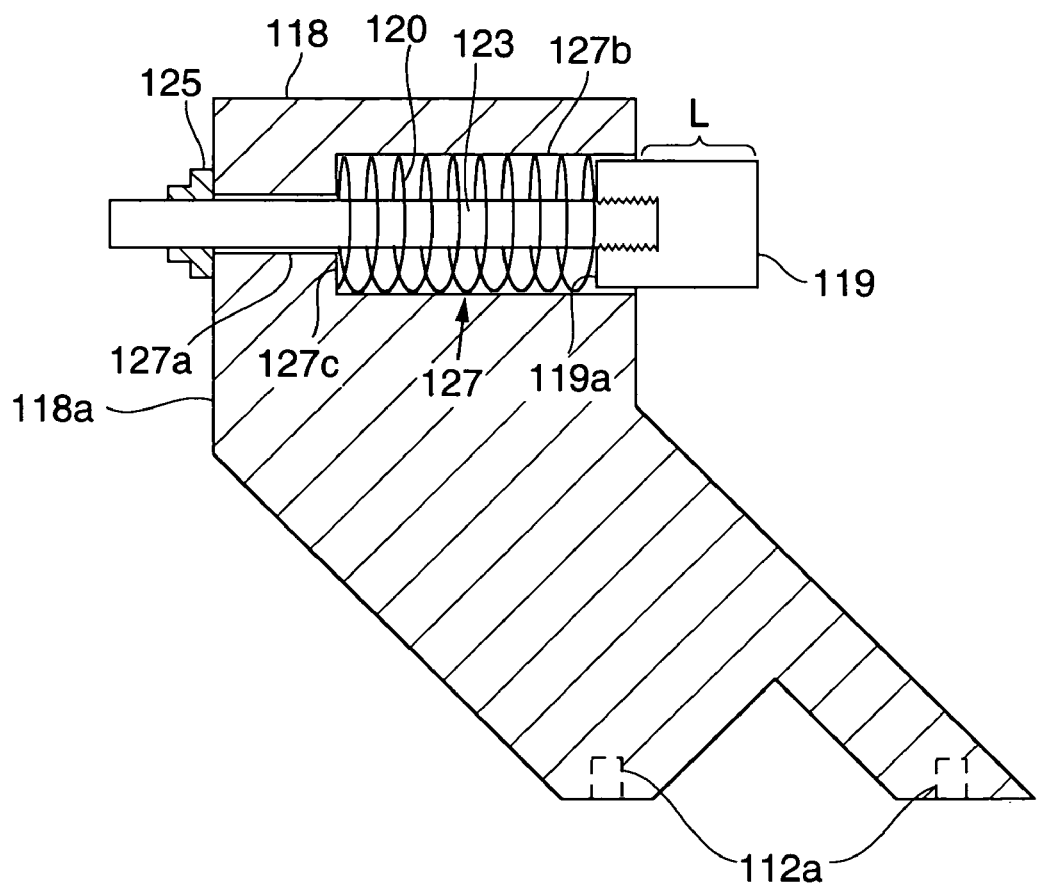
FIG. 11 is a side cross-sectional view of a subassembly (including housing 118 and plunger 119) of slicing knife assembly 110 of FIG. 10.

In the preferred embodiment shown in FIGS. 10 and 11, plunger 119 has a generally cylindrical shape, a threaded recess extends into plunger 119 from plunger 119's inner end surface 119a, and a threaded distal end of adjustment shaft 123 is screwed into this recess to mount plunger 119 fixedly to shaft 123. Cavity 127 is machined through block 118, with a small diameter portion 127a (through which shaft 123 but not plunger 119) can slide at block 118's back surface 118a (the surface facing away from knives 111 during operation of the inventive apparatus), a larger diameter portion 127b (through which plunger 119 can slide) at block 118's front surface, and shoulder 127c between cavity portions 127b and 127a. Compression spring 120, mounted around (and coaxial with) shaft 123, is compressed between plunger 119's inner end surface 119c and shoulder 127c of cavity 127. A self-locking nut 125 (preferably having a nylon self-locking insert) is threaded onto the threaded inner end of shaft 123 (the end of shaft 123 opposite to shaft 123's distal end which is attached to plunger 119). When spring 120 exerts biasing force (to the right in the FIG. 11 view) on plunger 119, the force exerted by block 118's back surface 118a on nut 125 (which is threaded onto shaft 123) prevents plunger 119 from translating (to the right in the FIG. 11 view) out from within cavity 127 beyond plunger 119's maximally extended position.

To assemble the FIG. 11 apparatus, plunger 119 attached to shaft 123's distal end, spring 120 is inserted into cavity portion 127b, and the free end of shaft 123 is inserted through cavity 127 until it protrudes out by a desired amount (to the left, beyond back surface 118a) from block 118 and the front surface of plunger 119 extends out from block 118's front surface by a desired amount (length "L" as shown in FIG. 11). Then, nut 125 is screwed onto shaft 123's free end (which is threaded) into engagement with block 118's back surface 118a, to prevent shaft 123 and plunger 119 from moving further to the right (in the FIG. 11 view) relative to block 118. After assembly, spring 120 (around shaft 123) is compressed between shoulder 127c and plunger 119, and the maximum amount ("L") by which plunger 119 protrudes out from block 118's front surface can be adjusted by repositioning nut 125 relative to shaft 123 (thereby allowing spring 120 to advance plunger 119's front surface further out from cavity 127, or overcoming the force exerted by spring 120 to retract plunger 119 further into cavity 127). The adjustable position of nut 125 along shaft 123 determines the orientation of slicing knives 111 in their fully advanced position (the position into which knives 111 are biased by plunger 119 and spring 120) relative to frame member 14a and the pitted olives to be sliced.

When a hard object (e.g., debris) pivots the slicing knives 111 about pin 117 against plunger 119, shaft 123 and plunger 119 translate together as a unit to the left (in the FIG. 11 view), plunger 119 retracts into block 118, and spring 120 compresses. When the hard object has moved out of engagement with knives 111, spring 120 relaxes back into its maximally extended state, forcing shaft 123 and plunger 119 to the right (in the FIG. 11 view) and pivoting knives 111 back (in the opposite direction about pin 117) into their normal position.

Knives 111 (including middle knife 111m) and plates 121 are fixedly attached to each other (e.g., by fasteners), with one plate 121 between each pair of knives 111. In a preferred embodiment, such fasteners include nut and bolt assemblies 111b (as shown in FIG. 10) and the assembly that includes nut 111c (shown in FIG. 10) and a hollow bolt (not visible in FIG. 10) engaged with nut 111c. To pivotably attach the slicing knife assembly (including knives 111 and plates 121) to arms 115 of the knife assembly holder, nut 111c is aligned with holes 116 of arms 115 and pin 117 is inserted through nut 111c, the hollow bolt engaged with nut 111c, and the aligned holes 116 of arms 115. When so assembled, knives 111 are free to pivot about pin 117 while they displace plunger 119 into block 118, and while plunger 119 displaces knives 111 back to their normal, fully extended position (in which they are spring-biased).

In the preferred embodiment shown in FIG. 10, the middle one of knives 111 (labeled "111m") has a portion 111x that protrudes out from corresponding portions of the other knives, so that each pitted olive will engage portion 111x of slicing knife 111m before the olive engages the other knives 111. The pitted olive engages portion 111x of slicing knife 111m while the retracting pitting knife 22 is still engaged with the olive, so that knife 22 prevents the olive from moving into a non-optimal orientation for slicing before the olive engages knife 111m. After the olive translates into engagement with portion 111x, the pitting knife 22 retracts (through plate 103) out of engagement with the olive.

In operation, each pitted olive (in one of the slicing pockets defined by chuck plate assembly 100) translates into engagement with portion 111x of knife 111m, and then translates into engagement with the other knives 111, so that the sharp, arcuate blades 111a of knives 111 can slice the olive.

While the pitted olive is engaged with knives 111, each knife 111 acts as a wedge to slice cleanly through the olive. In the embodiment of FIGS. 1–11, the three slicing knives 111 slice each typically-sized pitted olive into four clean slices. Grooves 101 in each slicing pocket 104 are oriented parallel to the circular path traversed by the slicing pocket and parallel to the parallel blades 111a of knives 111. The separation between knives 111 matches the separation between the centers of grooves 101 so that knives 111 have enough clearance to pass completely through the pitted olive in each slicing pocket 104 while avoiding the chucks 105.

Although the embodiment of FIGS. 1–11 includes three slicing knives 111, it is contemplated that any number of slicing knives may be included in variations on the embodiment of FIGS. 1–11.

Any means can be employed for loading olives onto chain 40 and/or to load olives between opposed pitting and coring knives. In the preferred embodiment, chain 40 pushes olives up inclined ramp 49 (shown in phantom view in FIG. 3) to load the olives into positions such that they can be engaged between opposed pitting and coring knives. Alternatively, a conveyor belt can be employed as a means for loading olives (e.g., for loading olives into positions in which they can be engaged between opposed pitting and coring knives). Similarly, any means can be employed for collecting the end product (pitted olive slices) from the apparatus after the slicing operation.

Figure 8:
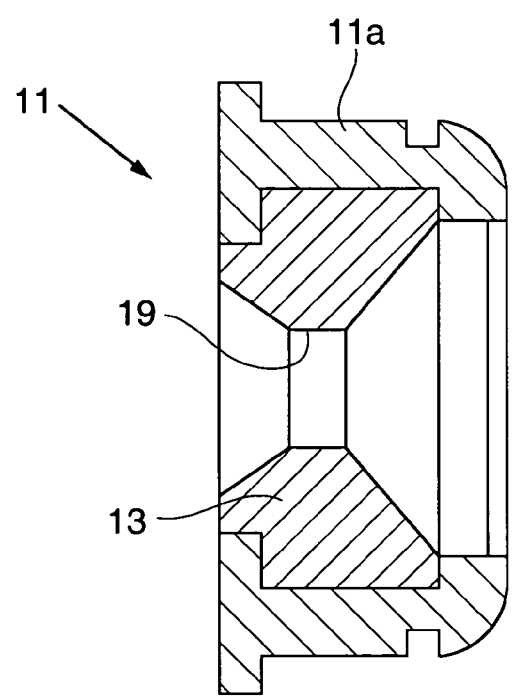
FIG. 8 is a cross-sectional view of one of inserts 11 of the FIG. 1 apparatus.

FIG. 8 is a cross-sectional view of a preferred embodiment of one of inserts 11. Insert 11 of FIG. 8 includes grooved base 11a which can be inserted into one of a number of holes around the periphery of plate 17. Insert 11 can be mounted to plate 17 by snapping a snap ring (not shown) into the groove in base 11a. Ring-shaped pitting cup 13 is fitted within base 11a. An inner cylindrical surface of cup 13 defines central orifice 19 which is sized for receiving one of coring knives 24 and an olive pit of typical size. In some embodiments, cup 13 is formed of rubber or another resilient material. Alternatively, cup 13 is formed of metal, rigid plastic, or other rigid material. An advantage of composing cup 13 of resilient material is that such a resilient cup 13 would be capable of temporarily deforming to admit an unusually large olive pit or an olive pit that is misoriented with its longitudinal axis perpendicular to the longitudinal axis of insert 11. Base 11a of insert 11 is typically composed of a rigid substance. In alternative embodiments, base 11a and cup 13 are combined (implemented as a single part).

In a class of embodiments, the method of the invention includes the steps of: advancing a pitting knife and a coring knife into engagement with a fruit (e.g., an olive); while translating the fruit along a segment of a circular first path, ejecting a pit from the fruit while the pitting knife (and typically also the coring knife) is engaged with the fruit and retracting the coring knife away from the fruit; then, retracting the pitting knife with the pitted fruit impaled thereon, thereby moving the pitted fruit along an at least generally helical path to a point along an at least substantially circular second path parallel to (but separated from) the first path; and then translating the pitted fruit along a segment of the second path past a set of spring-biased, pivotably mounted slicing knives in such a manner that the slicing knives engage with and slice the pitted fruit, where the slicing knives are spring-biased in a first orientation and have freedom to pivot away from the first orientation (e.g., in response to force exerted thereon by any hard object that translates along the segment of the second path) and then spring back into the first orientation. The slicing knives can commence their cuts while the pitted fruit is impaled on the pitting knife, and complete their cuts after the pitting knife has retracted away from the pitted fruit.

In other embodiments, the invention is a method for pitting and slicing a fruit (e.g., an olive) having a pit, including the steps of: (a) advancing a pitting knife and a coring knife aligned therewith into engagement with the fruit, thereby causing the coring knife to core one tip of the fruit; (b) advancing the pitting knife to push the fruit against a pitting cup, said pitting cup having an pit-receiving orifice extending therethrough, and continuing to advance the pitting knife while the fruit is constrained by the pitting cup to push the fruit's pit through the pit-receiving orifice and retracting the coring knife away from the fruit and the pitting cup, thereby converting the fruit to a pitted fruit; (c) after step (b), retracting the pitting knife with the pitted fruit impaled thereon, thereby pulling the pitted fruit into a slicing pocket defined by a chuck plate assembly; and (d) translating the pitted fruit in the slicing pocket into engagement with a set of spring-loaded slicing knives and retracting the pitting knife out of engagement with the pitted fruit, thereby causing the slicing knives sever the pitted fruit into slices.

It is contemplated that any of a wide variety of fruits may be processed by the inventive apparatus. For specificity, the invention has been described in embodiments suitable for processing (i.e., pitting and slicing) olives.

The foregoing is merely illustrative and explanatory of embodiments of the inventive method and apparatus. Various changes in the component sizes and shapes, and other details of the embodiments described herein may be within the scope of the appended claims.

What is claimed is:

1. A method for pitting and slicing a fruit, including the steps of:
    (a) advancing a pitting knife and a coring knife into engagement with the fruit;
    (b) while translating the fruit along a segment of a circular first path, ejecting a pit from the fruit while the pitting knife is engaged with the fruit and retracting the coring knife away from the fruit;
    (c) after step (b), retracting the pitting knife with the pitted fruit impaled thereon, thereby moving the pitted fruit along an at least generally helical path to a point along an at least substantially circular second path parallel to but separated from the first path; and
    (d) after step (c), translating the pitted fruit along a segment of the second path past a set of spring-biased, pivotably mounted slicing knives in such a manner that the slicing knives engage with and slice the pitted fruit, wherein the slicing knives are spring-biased in a first orientation and have freedom to pivot away from the first orientation and then spring back into the first orientation.

2. The method of claim 1, wherein the fruit is an olive.

3. The method of claim 1, wherein during step (d) at least one of the slicing knives engages the pitted fruit while said pitted fruit is impaled on the pitting knife and the slicing knives finish slicing the pitted fruit after the pitting knife has retracted away from the pitted fruit.

4. The method of claim 3, wherein the fruit is an olive.

5. A method for pitting and slicing a fruit having a pit, including the steps of:
    (a) advancing a pitting knife and a coring knife aligned therewith into engagement with the fruit, thereby causing the coring knife to core one tip of the fruit;
    (b) advancing the pitting knife to push the fruit against a pitting cup, said pitting cup having a pit-receiving orifice extending therethrough, and continuing to advance the pitting knife while the fruit is constrained by the pitting cup to push the fruit's pit through the pit-receiving orifice and retracting the coring knife away from the fruit and the pitting cup, thereby converting the fruit to a pitted fruit;
    (c) after step (b), retracting the pitting knife with the pitted fruit impaled thereon, thereby pulling the pitted fruit into a slicing pocket defined by a chuck plate assembly; and
    (d) translating the pitted fruit in the slicing pocket into engagement with a set of spring-loaded slicing knives and retracting the pitting knife out of engagement with the pitted fruit, thereby causing the slicing knives to sever the pitted fruit into slices.

6. The method of claim 5, wherein the fruit is an olive.

7. The method of claim 5, wherein during step (d) at least one of the slicing knives engages the pitted fruit while said pitted fruit is impaled on the pitting knife and the slicing knives finish slicing the pitted fruit after the pitting knife has retracted away from the pitted fruit.

8. The method of claim 7, wherein the fruit is an olive.

* * * * *